US008519962B2

(12) United States Patent
Han et al.

(10) Patent No.: US 8,519,962 B2
(45) Date of Patent: Aug. 27, 2013

(54) MOBILE TERMINAL

(75) Inventors: Junhee Han, Seoul (KR); Dongseuck Ko, Suwon (KR); Seong-cheol Lee, Seoul (KR); Sunwon Yoo, Anyang (KR)

(73) Assignee: LG Electronics Inc., Seoul (KR)

( * ) Notice: Subject to any disclaimer, the term of this patent is extended or adjusted under 35 U.S.C. 154(b) by 406 days.

(21) Appl. No.: 12/909,785

(22) Filed: Oct. 21, 2010

(65) Prior Publication Data
US 2011/0115712 A1 May 19, 2011

(30) Foreign Application Priority Data

Nov. 17, 2009 (KR) ........................ 10-2009-0111128

(51) Int. Cl.
*G06F 3/02* (2006.01)
(52) U.S. Cl.
USPC .................... 345/169; 345/173; 455/575.1
(58) Field of Classification Search
USPC ... 345/179, 905, 168–175; 178/19.06–19.07, 178/64; 455/575.1–575.8
See application file for complete search history.

(56) References Cited

U.S. PATENT DOCUMENTS

| | | | | |
|---|---|---|---|---|
| 5,173,686 A * | 12/1992 | Fujihara | ........................ | 345/87 |
| 7,113,175 B2 * | 9/2006 | Liu et al. | ....................... | 345/173 |
| 7,425,947 B1 * | 9/2008 | Tseng et al. | .................. | 345/169 |
| 7,990,103 B2 * | 8/2011 | Klinghult | ....................... | 320/108 |
| 8,018,716 B2 * | 9/2011 | McCoy | ..................... | 361/679.07 |
| 8,180,395 B2 * | 5/2012 | Moran et al. | ................ | 455/556.1 |
| 8,339,372 B2 * | 12/2012 | Rofougaran | ................... | 345/173 |
| 2002/0082042 A1 * | 6/2002 | Mark et al. | ..................... | 455/550 |
| 2005/0054393 A1 * | 3/2005 | Fagerstrom et al. | ........ | 455/575.1 |
| 2007/0109116 A1 * | 5/2007 | Burr | ......................... | 340/539.12 |
| 2009/0065269 A1 * | 3/2009 | Katsurahira | ............... | 178/19.06 |
| 2009/0244009 A1 * | 10/2009 | Staats et al. | ................... | 345/168 |
| 2010/0039387 A1 * | 2/2010 | Locker et al. | ................. | 345/168 |
| 2010/0052431 A1 * | 3/2010 | Mita | ............................. | 307/104 |

* cited by examiner

*Primary Examiner* — Vijay Shankar
*Assistant Examiner* — Sanjiv D Patel
(74) *Attorney, Agent, or Firm* — Lee, Hong, Degerman, Kang & Waimey

(57) ABSTRACT

A mobile terminal includes: a terminal main body having a wireless communication module; a wireless keypad configured to input information to the terminal main body and operating in a tactile manner; and a driving unit configured to operate the wireless keypad by using power of the terminal main body, wherein the driving unit includes: first and second electrodes mounted in the terminal main body and the wireless keypad; an electric field formation unit provided in the terminal body and applying voltage to the first electrode to form an electric field between the first and second electrodes; and a controller mounted in the terminal body and detecting information regarding a touch applied to the wireless keypad based on a change in the electric field generated by a touch applied to the wireless keypad.

24 Claims, 16 Drawing Sheets

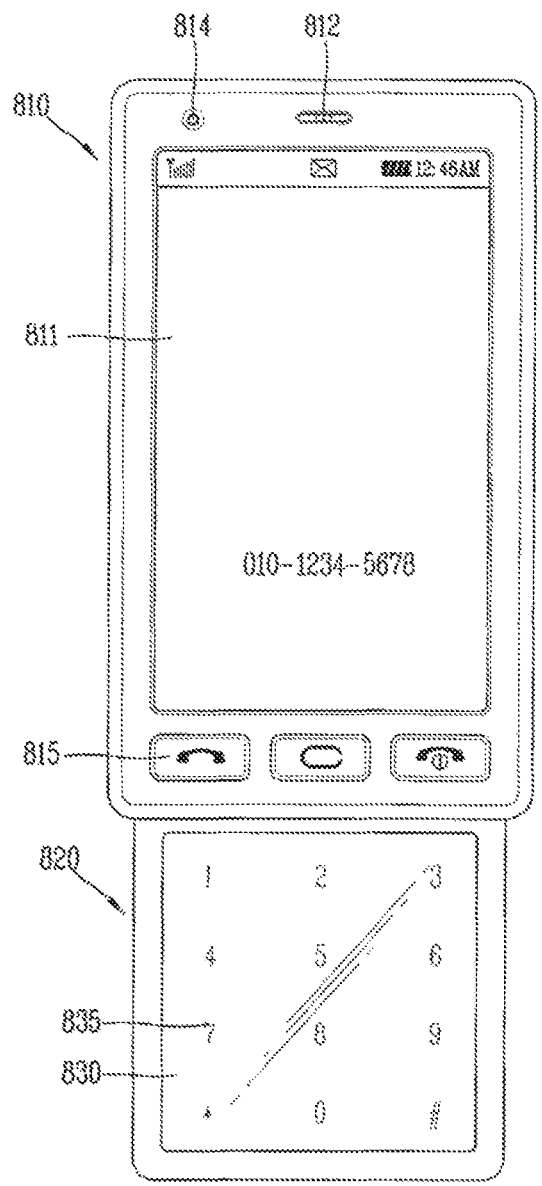

MOBILE TERMINAL

CROSS REFERENCE TO RELATED APPLICATIONS

The present application claims the benefit of earlier filing date and right of priority to Korean Application No. 10-2009-0111128 filed on Nov. 17, 2009, the entire contents of which is hereby incorporated by reference in its entirety.

BACKGROUND OF THE INVENTION

1. Field of the Invention

The present invention relates to a mobile terminal.

2. Description of the Related Art

In general, terminals may be divided into a mobile terminal and stationary terminal according to whether or not terminals are movable. In addition, mobile terminals may be divided into a handheld terminal and a vehicle mount terminal according to whether or not users can directly carry it around.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Efforts are ongoing to support and increase the functionality of mobile terminals. Such efforts include software and hardware improvements, as well as changes and improvements in the structural components which form the mobile terminal.

Recently, as mobile terminals are being reduced in size and simplified, the size, number, and area of an input device of mobile terminals tend to be reduced. Thus, an input device configured to be separated from a mobile terminal is used to input information to the mobile terminal.

As such a separate input device, a wireless keypad may be applied. The wireless keypad includes a wireless communication module for communicating with the mobile terminal wirelessly, a battery for supplying required power to the wireless communication module, and the like. The wireless keypad is a supplementary input device of the mobile terminal, so various attempts are being made to minimize the size and thickness of the wireless keypad.

SUMMARY OF THE INVENTION

Accordingly, one object is to provide a wireless keypad structure of a novel form which can be operated by using power of a main body of a terminal without having a power supply unit therein.

To achieve these and other advantages and in accordance with the purpose of the present invention, as embodied and broadly described herein, the present invention provides in one aspect a mobile terminal including: a terminal main body having a wireless communication module; a wireless keypad configured to input information to the terminal main body and operating in a tactile manner; and a driving unit configured to operate the wireless keypad by using power of the terminal main body, wherein the driving unit includes: first and second electrodes mounted in the terminal main body and the wireless keypad; an electric field formation unit provided in the terminal body and applying voltage to the first electrode to form an electric field between the first and second electrodes; and a controller mounted in the terminal body and detecting information regarding a touch applied to the wireless keypad based on a change in the electric field generated by a touch applied to the wireless keypad.

The electric field formation unit may be implemented as a battery for supplying power to the terminal main body.

The wireless keypad may include a touch pad having a plurality of conductive patterns for detecting a touch, and the conductive patterns may be connected to the second electrode.

A plurality of channel units for grouping the conductive patterns may be additionally disposed between the conductive patterns and the second electrode, and the channel units may have a different impedance value, respectively.

The wireless keypad may further include an illumination unit for illuminating the touch pad, and a power supply unit may be further provided between the terminal main body and the wireless keypad in order to supply power to the illumination unit by using power of the terminal main body. Here, the power supply unit may include a magnetic field generation coil connected to one side of the first electrode and generating a magnetic field by voltage of the electric field formation unit and a magnetism induction coil connected to the second electrode and the illumination unit and generating an induced electromotive force by an electric field of the magnetic field generation coil.

A keypad mounting part for mounting the wireless keypad may be formed on one surface of the terminal main body, and the wireless keypad may be detachably mounted to the keypad mounting part by means of an attaching and detaching unit.

A withdrawal hole may be formed on the terminal main body, and the wireless keypad may be mounted in the interior of the withdrawal hole such that it can be drawn out of the withdrawal hole.

The mobile terminal may further include a pouch to which the terminal main body is detachably coupled, and the wireless keypad may be detachably mounted on the pouch. Here, a plurality of wireless keypads may be formed to be replaced to be mounted in the pouch.

To achieve these and other advantages and in accordance with the purpose of the present invention, as embodied and broadly described herein, the present invention provides in another aspect a mobile terminal including: a first body having a wireless communication module; a second body connected to the first body such that the second body can be relatively movable with respect to the first body; a touch input unit mounted on the second body and operating in a tactile manner; and a driving unit configured to operate the touch input unit by using power of the first body, wherein the driving unit includes: first and second electrodes mounted on the first and second bodies, respectively; an electric field formation unit provided in the first body and forming an electric field between the first and second electrodes by applying voltage to the first electrode; and a controller mounted on the first body and detecting information regarding a touch applied to the touch input unit based on a change in the electric field generated by the touch applied to the touch input unit.

The second body may be connected to the first body such that it is relatively slidably movable with respect to the first body, or the second body may be rotatably connected to the first body.

The second body may be configured to be withdrawn along a first direction from the first body, and a third body slidable along a second direction may be further provided on one surface of the first body.

The second body may include a slide part slidably movable along the side of the first body and a cover part formed to be coupled to the slide part and slidably movable along a rear surface of the first body. The touch input unit may be configured to be coupled to the slide part such that it can be withdrawn from the interior of the first body.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 12A and 12B are plan views showing an operational state of the mobile terminal illustrated in FIG. 11.

DETAILED DESCRIPTION OF THE INVENTION

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

The mobile terminal described in the present invention may include mobile phones, smart phones, notebook computers, digital broadcast receivers, PDAs (Personal Digital Assistants), PMPs (Portable Multimedia Player), navigation devices, and the like.

Figure 1:
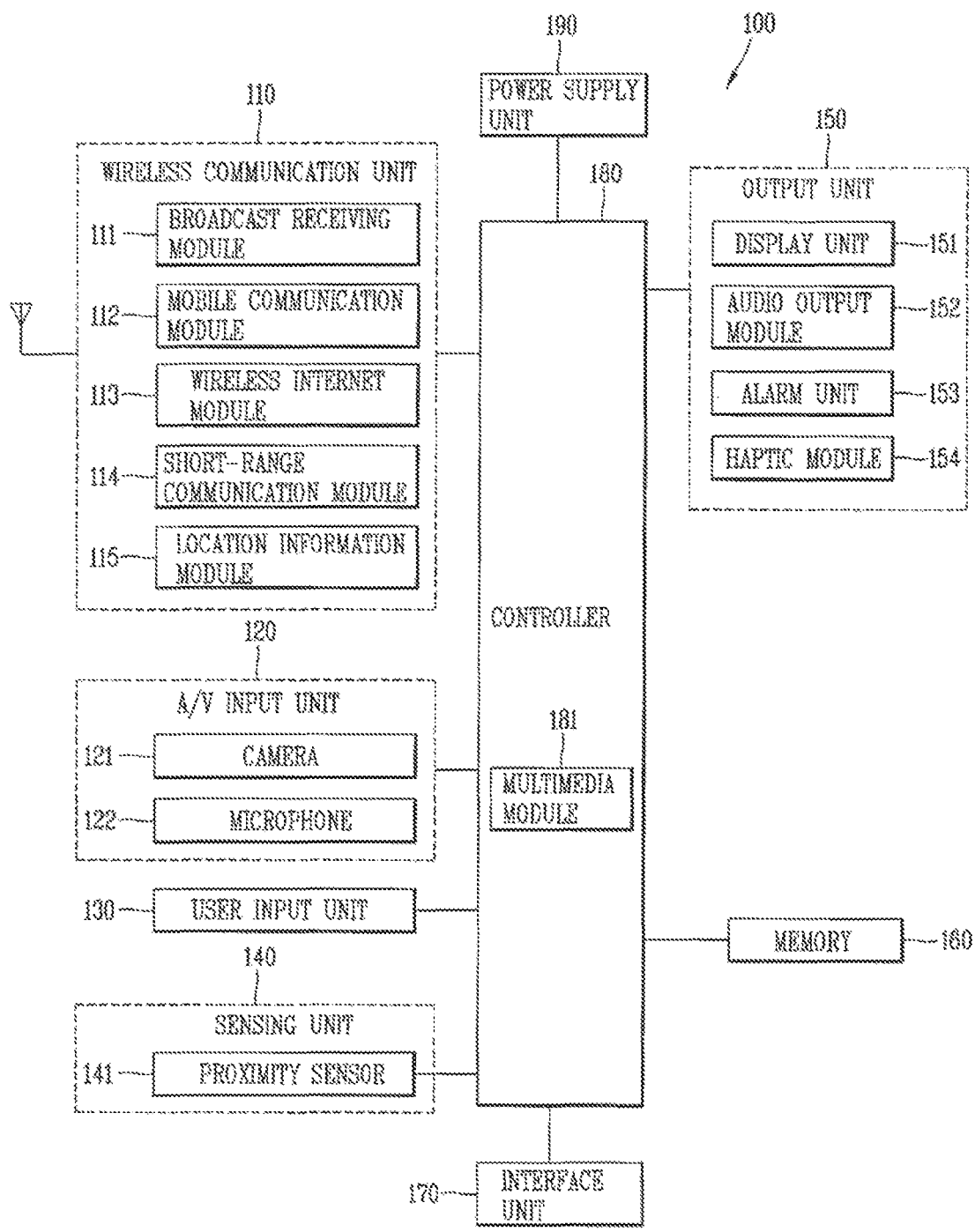
FIG. 1 is a schematic block diagram of a mobile terminal according to an exemplary embodiment of the present invention.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System).

With reference to FIG. 1, the A/V input unit 120 is configured to receive an audio or video signal. The NV input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units (or other display means) according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 2A:
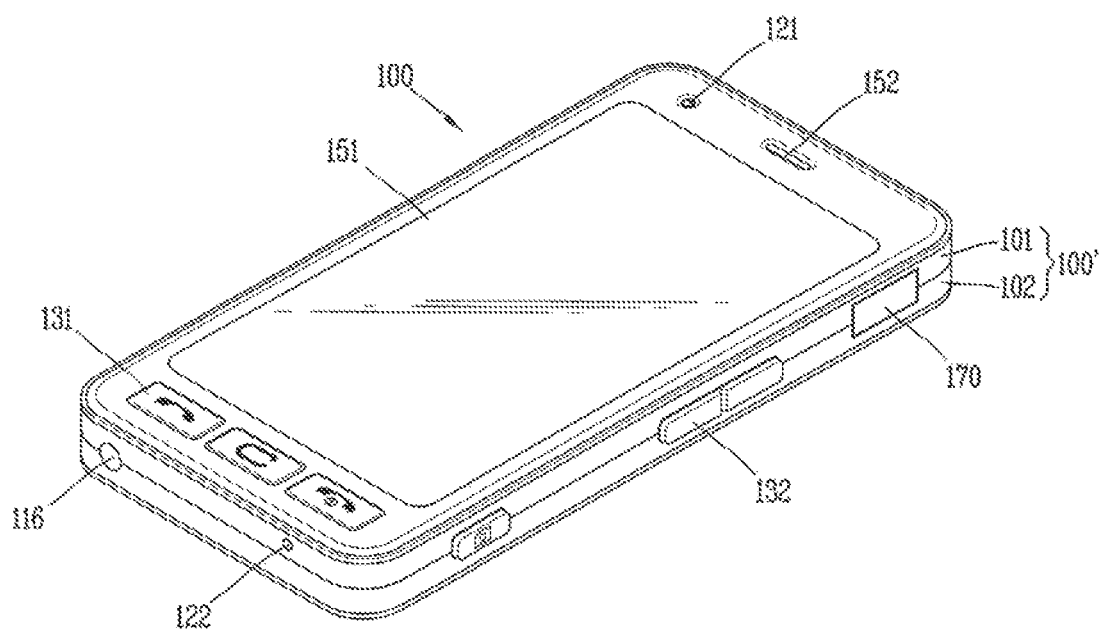
FIG. 2A is a front perspective view of the mobile terminal according to an exemplary embodiment of the present invention.

FIG. 2A is a front perspective view of a mobile terminal implementing an embodiment of the present invention;

The disclosed mobile terminal 100 includes a terminal main body 100' and a wireless keypad 200.

The terminal body 100' has a bar type terminal body. However, without being limited thereto, the present invention can be also applicable to a slide type mobile terminal, a folder type mobile terminal, a swing type mobile terminal, a swivel type mobile terminal and the like, including two or more bodies.

The terminal body includes a case (or casing, housing, cover, etc.) constituting the external appearance of the terminal body. In the present exemplary embodiment, the case may be divided into a front case 101 and a rear case 102. Various electronic components, e.g., a wireless communication module 110, are installed in the space between the front case 101 and the rear case 102. One or more intermediate cases may be additionally disposed between the front case 101 and the rear case 102.

The cases may be formed by injection-molding a synthetic resin or may be made of a metallic material such as stainless steel (STS) or titanium (Ti), etc.

The display unit 151, the audio output module 152, camera 121, and the user input unit 130 (131, 132), the microphone 122, the interface 170, and the like, may be located on the terminal body, namely, mainly, on the front case 101.

The display unit 151 occupies the most portion of the front surface of the front case 102. The audio output module 152 and the camera 121 are disposed at a region adjacent to one of both end portions of the display unit 151, and the user input unit 131 and the microphone 122 are disposed at a region adjacent to another of the both end portions. The user input unit 132, the interface 170, and the like, may be disposed at the sides of the front case 101 and the rear case 102.

The user input unit 130 is manipulated to receive commands for controlling the operation of the mobile terminal 100, and may include a plurality of manipulation units 131 and 132. The manipulation units 131 and 132 may be generally called a manipulating portion, and they can employ any method so long as they can be manipulated in a tactile manner by the user.

Content inputted by the first and second manipulation units 131 and 132 may be variably set. For example, the first manipulation unit 131 receives commands such as start, end, scroll, or the like, and the second manipulation unit 132 may receive commands such as adjustment of size of a sound outputted from the audio output module 152 or conversion to a touch recognition mode of the display unit 151.

Figure 2B:
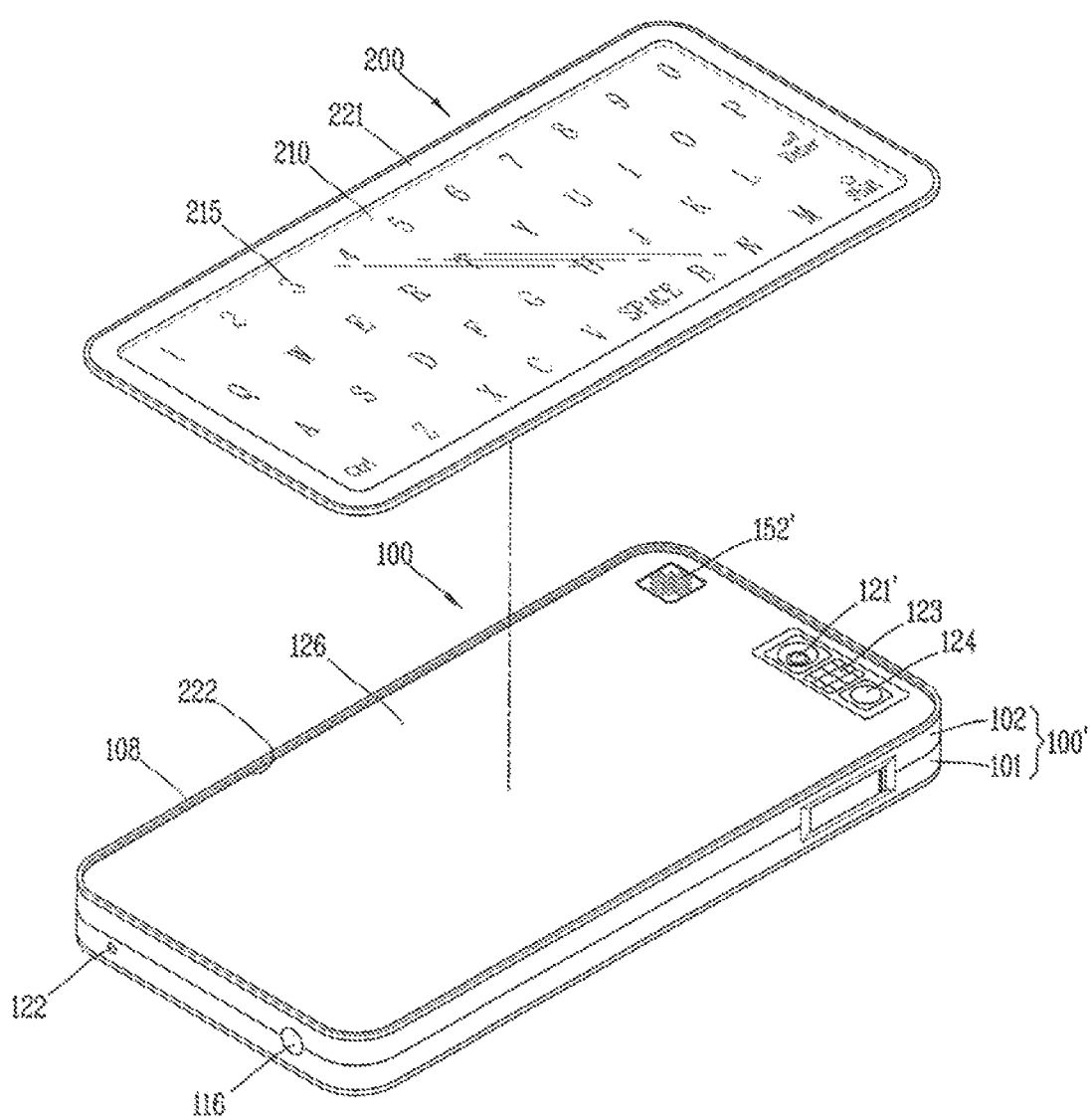
FIG. 2B is a rear perspective view of the mobile terminal according to an exemplary embodiment of the present invention.

FIG. 2B is a rear perspective view of the mobile terminal illustrated in FIG. 2a according to an exemplary embodiment of the present invention.

With reference to FIG. 2B, a camera 121' may additionally be disposed on a rear surface of the terminal body, namely, on the rear case 102. The camera 121' may have an image capture direction which is substantially opposite to that of the camera 121 (See FIG. 2A), and may support a different number of pixels (i.e., have a different resolution) than the camera 121.

For example, camera 121 may operate with a relatively lower resolution to capture an image(s) of the user's face and immediately transmit such image(s) to another party in real-time during video call communication or the like. Meanwhile the camera 121' may operate with a relatively higher resolution to capture images of general objects with high picture quality, which may not require immediately transmission in real time. The cameras 121 and 121' may be installed on the terminal such that they are rotated or popped up.

A flash 123 and a mirror 124, may be additionally disposed adjacent to the camera 121'. When an image of the subject is captured with the camera 121', the flash 123 illuminates the subject. The mirror 124 allows the user to see himself when he wants to capture his own image (i.e., self-image capturing) by using the camera 121'.

An audio output unit 152' may be additionally disposed on the rear surface of the terminal body. The audio output unit 152' may implement a stereoscopic function along with the audio output module 152 (See FIG. 2A), and may be used for implementing a speaker phone mode during call communication.

A broadcast signal receiving antenna 116 may be disposed at the side of the terminal body in addition to an antenna that supports mobile communications. The antenna 116 forming a portion of the broadcast reception module 111 (in FIG. 1) may be installed to be protracted.

A power supply unit for supplying power to the mobile terminal 100 may be mounted on the terminal body in order to supply power to the mobile terminal 100. The power supply unit may be installed in the terminal body or may be directly detached from the outside of the terminal body. A battery cover 126 may be detachably coupled to the terminal body in order to cover the power supply unit.

Meanwhile, a wireless keypad 200 provided to be separated from the terminal body 100' operates in a tactile manner. The wireless keypad 200 may be formed as a member separated from the terminal body 100' to allow the user to carry it around separately or may be detachably attached to one side of the terminal main body 100'. In the present exemplary embodiment, it is illustrated that the wireless keypad 200 is mounted on the rear surface of the terminal main body 100', but the wirelessly keypad 200 may be detachably attached to the front and rear surfaces of the terminal main body 100'.

A keypad mounting part 108 is formed on the rear surface of the terminal main body 100' in order to mount the wireless keypad 200 thereon. The keypad mounting part 108 is formed to extend from the rear surface of the rear case 102 to confine an outline of the wireless keypad 200.

The wireless keypad 200 may include a touch pad 210 available for a touch input. Characters, numbers, symbols, and the like, 215 may be displayed on the touch pad 210. When the user touches the characters, the numbers, symbols, and the like 215, corresponding information is inputted to the terminal main body 100'. Such characters, numbers, symbols, and the like 215 may have a Qwerty key arrangement to allow the user to conveniently perform inputting.

The touch pad 210 may be made of a light-transmissive material (or a transparent material). In this case, the touch pad 210 may be made of a light-transmissive resin material or may be made of a tempered glass material. Accordingly, even in a state in which the wireless keypad 200 is mounted on the terminal main body 100', an image of a subject can be captured by using the camera 121'. In the present exemplary embodiment, for example, the touch pad 210 is made of a light-transmissive material, but the present invention is not limited thereto and the touch pad 210 may be made of a non-light-transmissive material.

The wireless keypad 200 may be detachably coupled too the terminal main body 100' by an attaching and detaching unit. The attaching and detaching unit may include, for example, an outline member 221 made of a metal formed on the outline of the wireless keypad 200 and a magnet 222 mount on the keypad mounting part 108. When the magnet 222 is mounted on the keypad mounting part 108, it surrounds the outline member 221, and the wireless keypad 200 is coupled to the terminal main body 100' by a magnetic force generated between the outline member 221 and the magnet 222.

Figure 3A:
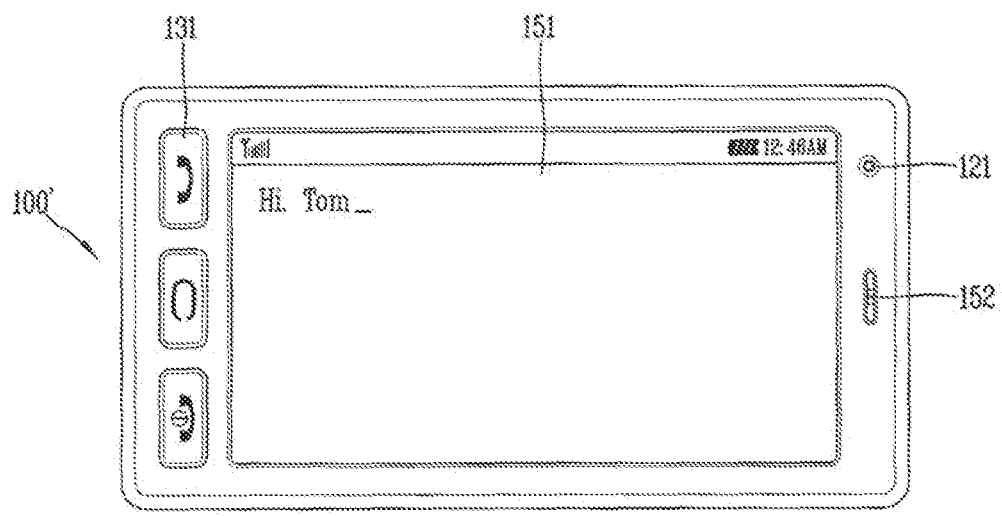
FIGS. 3A and 3B are front views of the mobile terminal for explaining operational states of the mobile terminal according to an exemplary embodiment of the present invention.
Figure 3A:
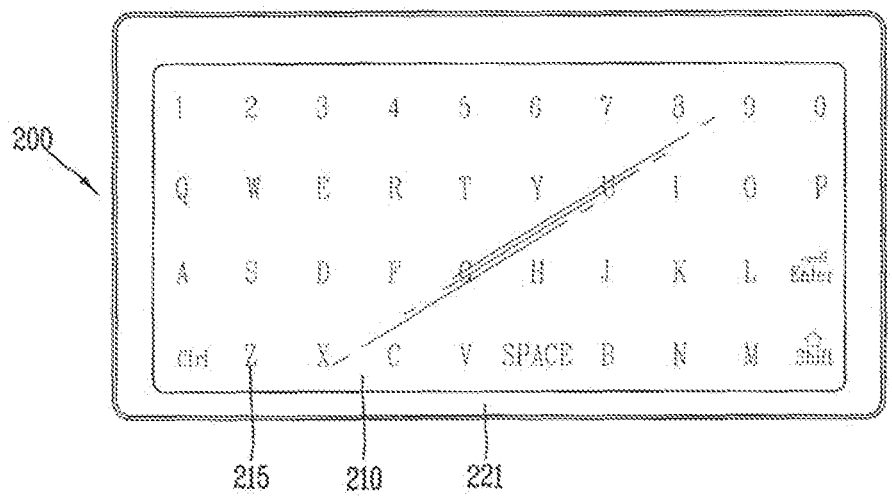
Figure 3B:
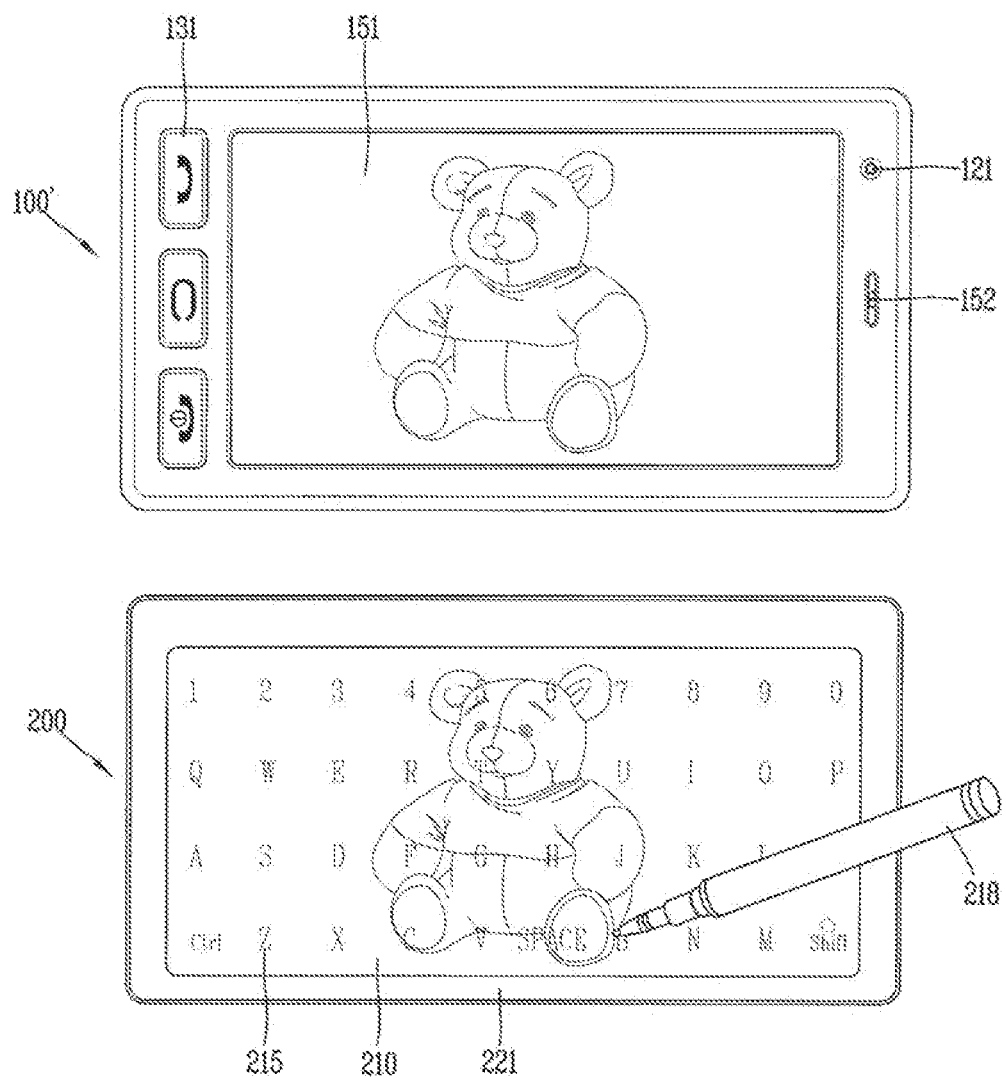

FIGS. 3A and 3B are front views of the mobile terminal for explaining operational states of the mobile terminal according to an exemplary embodiment of the present invention.

In FIGS. 3A and 3B, information is inputted to the terminal main body 100' by using the wireless keypad 200. The wireless keypad 200 is operated in a state of being placed within a certain area near the terminal main body 100'.

FIG. 3A shows a case in which a text input mode is executed on the terminal main body 100'. When the user touches the number, character, 215, etc., displayed on the touch pad 210, corresponding touch information is transferred to the terminal main body 100', and accordingly, the number, character, etc., corresponding to the touch information is displayed on the display unit 151.

FIG. 3B shows a case in which a handwriting mode is executed on the terminal main body 100'. When the user moves to have a particular directionality in a state that his finger or a touch pen 218 is touched on the touch pad 210, information corresponding to its locus is displayed on the display unit 151. The user can draw a simple picture or make a simple note without having to input a key as shown in FIG. 3A.

Having such an operational state, the wireless keypad 200 does not have a power supply unit, like the terminal main body 100'. Thus, the wireless keypad according to an exemplary embodiment of the present invention may be called a 'powerless wireless keypad'. According to an exemplary embodiment, power for operating the wireless keypad 200 uses the power of the terminal main body 100'. To this end, the mobile terminal includes a driving unit 300 (See FIG. 5) for operating the wireless keypad by using the power of the terminal main body 100'. Hereinafter, the configuration of the driving unit 300 will now be described.

Figure 4:
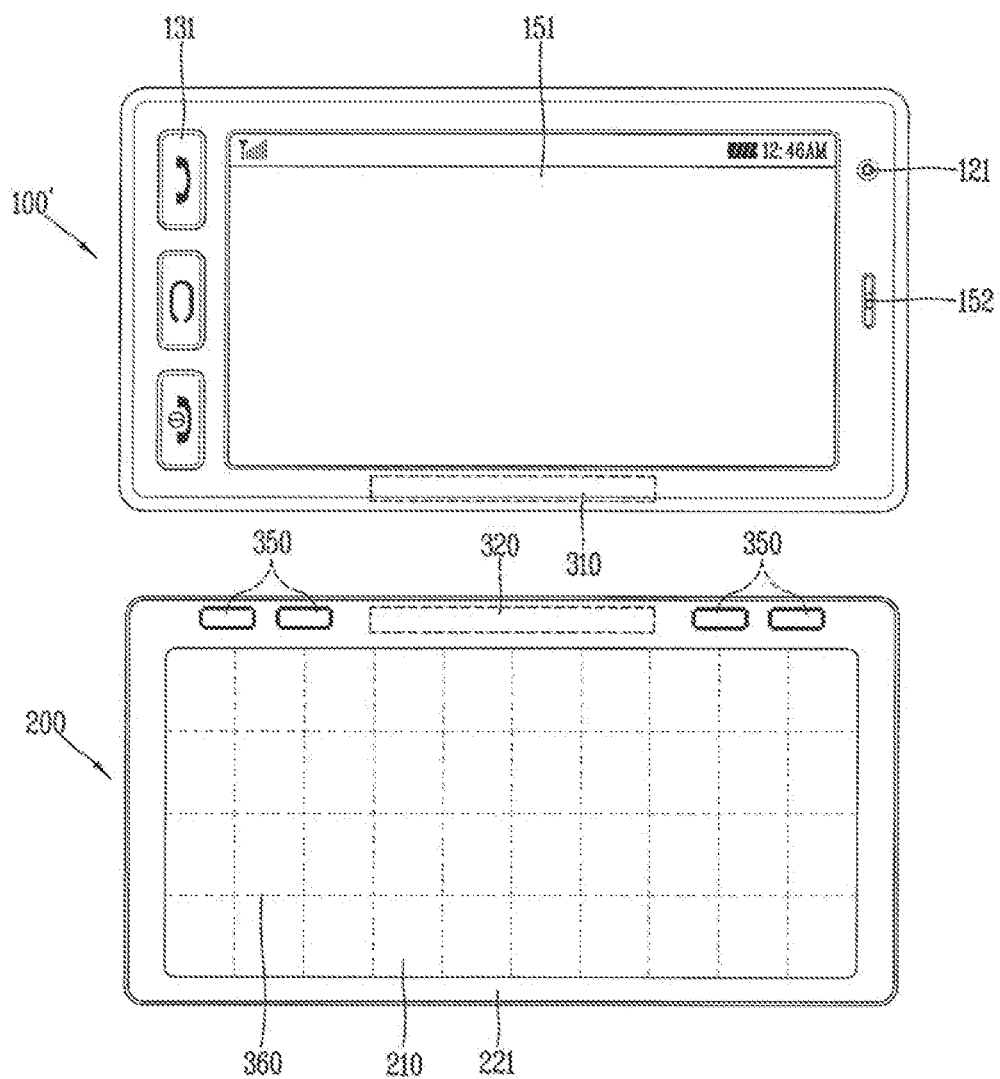
FIG. 4 is a schematic view of a terminal main body and a wireless keypad for explaining the configuration of a driving unit.
Figure 5:
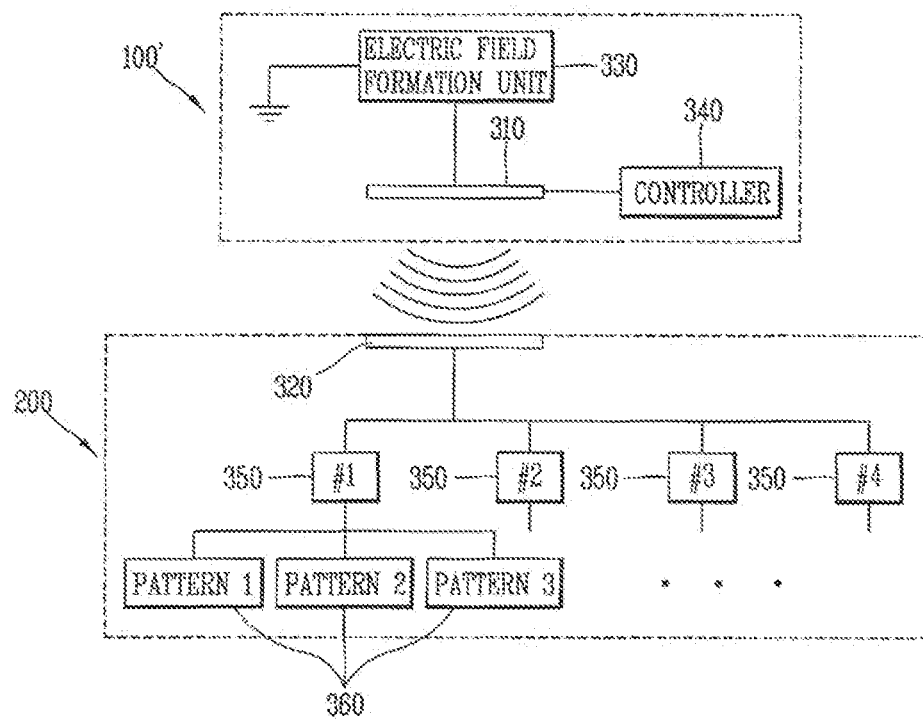
FIG. 5 is a conceptual view showing the configuration and operational state of the driving unit illustrated in FIG. 4.

FIG. 4 is a schematic view of a terminal main body and a wireless keypad for explaining the configuration of a driving unit, and FIG. 5 is a conceptual view showing the configuration and operational state of the driving unit illustrated in FIG. 4.

With reference to FIGS. 4 and 5, the driving unit 300 includes a first electrode 310, a second electrode 320, an electric field formation unit 330, and a controller 340.

The first and second electrodes 310 and 320 are conductors which are mounted on the terminal main body 100' and the wireless keypad 200. When the wireless keypad 200 is operated, the first and second electrodes 310 and 320 may be mounted on different positions according to the position of the wireless keypad 200. Preferably, the first and second electrodes 310 and 320 are disposed to face each other when the wireless keypad 200 is operated. To this end, the first and second electrodes 310 and 320 may be mounted on the corner portions of the terminal main body 100' and the wireless keypad 200.

The electric field formation unit 330 is mounted on the terminal main body 100' and connected to the first electrode 310. The electric field formation unit 330 applies voltage to the first electrode 310 to form an electric field between the first and second electrodes 310 and 320.

The electric field formation unit 330 may be implemented as a power supply unit, namely, as a battery, for supplying power to the terminal main body 100'. When the electric field formation unit 330 applies a certain voltage to the first electrode 310, a certain potential difference is generated between the first and second electrodes 310 and 320, so an electric field is generated between the first and second electrodes 310 and 320.

The touch pad 210 includes a plurality of conductive patterns 360 formed thereon in order to detect a touch applied thereto. The conductive patterns 360 may be formed in various shapes such as in a linear shape, in zigzags, in a polygonal shape, and the like. The conductive patterns 360 are electrically connected to the second electrode 320. Because an electric field is formed between the first and second electrodes 310 and 320, an electrical path is formed between the conductive patterns 360 and the first electrode 310.

The controller 340 is mounted on the terminal main body 100' and connected with the first electrode 310. When the user applies a touch to the wireless keypad 200, the electric field between the first and second electrodes 310 and 320 changes, and the controller 340 detects information regarding the touch applied to the wireless keypad 200 on the basis of the changed electric field.

When the user brings his finger into contact with the position where the conductive patterns 360 are formed, impedance of the conductive patterns 360 is changed. Accordingly, capacitance between the first and second electrodes 310 and 320 changes, and the electric field between the first and second electrodes 310 and 320 is also changed. Because the variation of the capacitance changes according to the position of the touch applied to the touch pad, by which the touched position can be detected.

The controller 340 may have a separate configuration from that of the controller 180 as described above or may be included in the controller 180.

A plurality of channel units 350 may be additionally provided between the conductive patterns 360 and the second electrode 320. The channel units 350 groups the conductive patterns 360 by channels to allow the controller 340 to effectively detect touch information. The plurality of conductive patterns 360 are connected to each of the channel units 350, and the channel units 350 have a different impedance value, respectively. Also, resistors each having a different length, are connected to the channel units 350 so that the respective conductive patterns can have a different impedance value. Accordingly, the respective channel units 350 generate signals of different frequencies, and thus, the controller 340 of the terminal main body 100' can recognize a channel unit 350 which has generated a signal.

According to the present exemplary embodiment, four channel units 350 are connected to the second electrode 320, and the conductive patterns 360 are grouped by the four channel units 350. the channel units have a form of an electronic device. The channel units 350 and the second electrode 320 may be positioned at an inner side of the outline member 221 made of a non-light-transmissive material not seen from an outer side.

Figure 6:
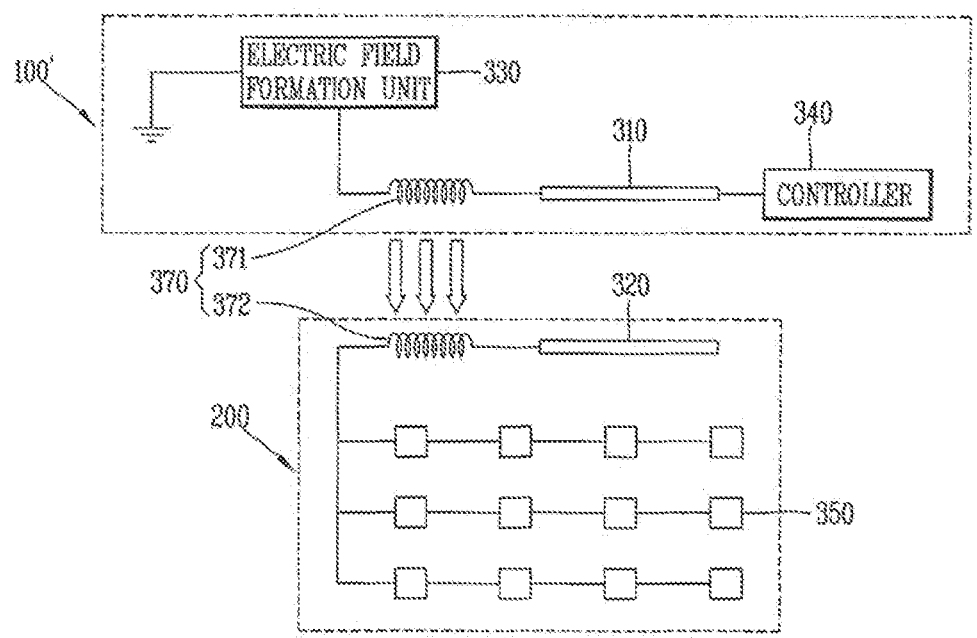
FIG. 6 is a conceptual view showing a configuration and operational state of the driving unit according to another exemplary embodiment of the present invention.

FIG. 6 is a conceptual view showing a configuration and operational state of the driving unit according to another exemplary embodiment of the present invention.

A mobile terminal according to the another exemplary embodiment of the present invention further includes a lighting unit 380 and a power supply unit 370 in addition to the elements of the mobile terminal of the former exemplary embodiment. The other elements than the lighting unit 380 and the power supply unit 370 are the same as those of the former exemplary embodiment. In FIG. 6, illustration of the channel units 350 and conductive patterns 360 are omitted, but these elements are the same as those of the former exemplary embodiment.

The lighting unit 380 illustrates the touch pad 210, which is implemented in the form of a light emitting element such as a light emitting diode (LED). A plurality of lighting units may be formed to be attached to a plurality of positions of the touch pad 210.

The power supply unit 370 serves to apply power to the illumination unit 380 by using power of the terminal main body 100' and is provided between the terminal main body 100' and the wireless keypad 200.

The power supply unit 370 may include a magnetic field generation coil 371 provided to the terminal main body 100' and a magnetism induction coil 372 provided to the wireless keypad 200.

The magnetic field generation coil 371 is connected to one side of the first electrode 310, and generates magnetic field by voltage provided by the electric field formation unit 330.

The magnetism induction coil 372 is connected to the second electrode 320 and the illumination unit 380. The magnetic field generation coil 371 and the magnetism induction coil 372 are disposed to be magnetically coupled. The magnetism induction coil 372 generates an induced electromotive force according to the magnetic field generated by the magnetic field generation coil 372, and accordingly, power is supplied to the illumination unit 380.

With such a configuration, the wireless keypad 200 is available for a touch input to the touch pad and illuminates the touch pad by using power of the terminal main body 100' without having a power source to itself. Thus, because a component for supplying power to the wireless keypad 200 does not need to be mounted, the thickness and size of the wireless keypad 200 can be minimized, and restrictions in designing can be reduced.

Figure 7:
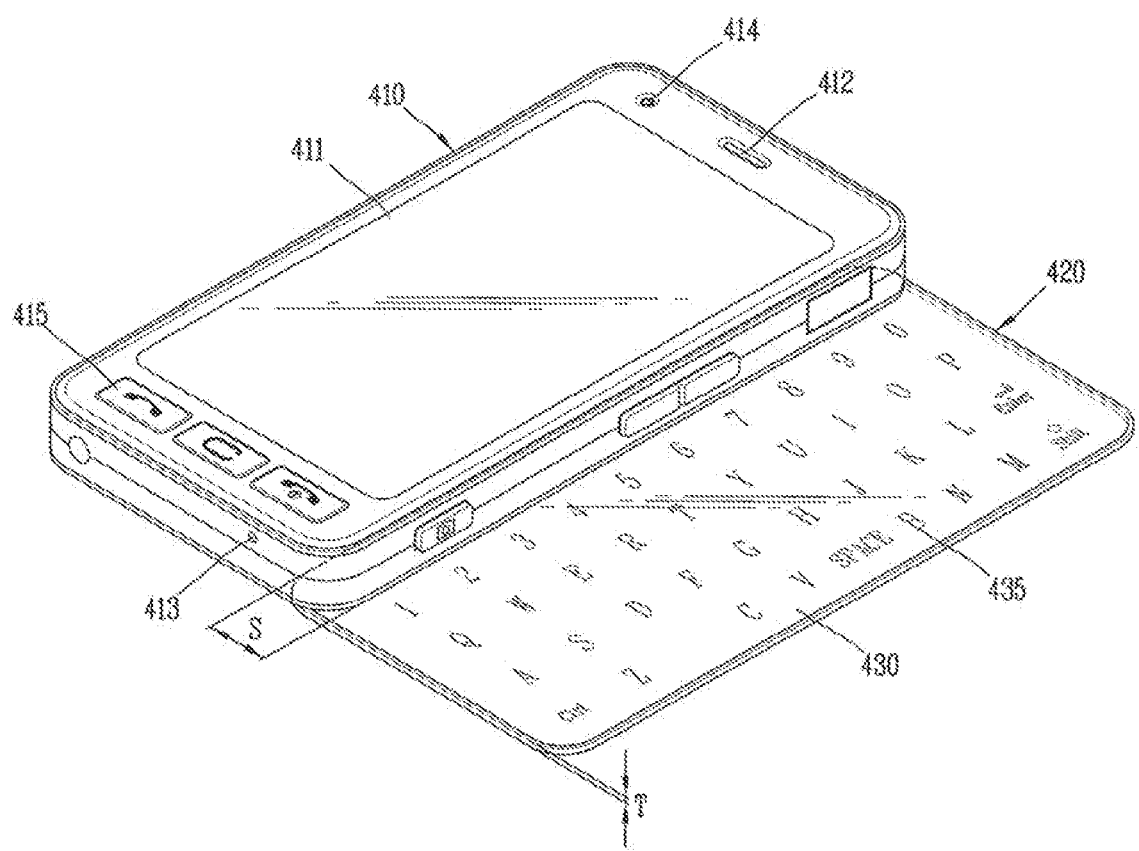
FIG. 7 is a perspective view of a mobile terminal according to a second exemplary embodiment of the present invention.

FIG. 7 is a perspective view of a mobile terminal according to a second exemplary embodiment of the present invention.

The mobile terminal according to the second exemplary embodiment of the present invention includes a first body 410 and a second body 420 connected to be relatively movable with respect to the first body 410. In the present exemplary embodiment, a slide type terminal having the second body 420 connected to one surface of the first body 410 such that it can be slidably moveable is illustrated. As shown in FIG. 7, the second body 420 is slidably connected on a rear surface of the first body 410.

The first body 410 may include a display unit 411, a speaker 412, a microphone 413, a camera 414, and a user input unit 415, and the like, and the second body 420 includes a touch input unit 430 operated in a tactile manner. The touch input unit 430 has the same configuration as that of the touch pad 210 of the former exemplary embodiment. Characters, numbers, and the like, 435 indicating input information are displayed on the touch input unit 430.

An open configuration in which the touch input unit 430 is exposed according to a relative movement of the second body 420, and a closed configuration in which the touch input unit 430 is closed by the first body 410 may be implemented.

Likewise as the former exemplary embodiment, the mobile terminal includes a driving unit for operating the touch input unit by using power of the first body 410. The configuration of the driving unit is similar to that of the former exemplary embodiment. Namely, the driving unit includes first and second electrodes mounted on the first and second bodies 410 and 420, an electric field formation unit provided to the first body 410 and applying voltage to the first electrode to form an electric field between the first and second electrodes, and a controller mounted on the first body 410 and detecting information regarding a touch applied to the touch input unit 430 on the basis of a change in an electric field generated by the touch applied to the touch input unit 430.

The configuration of the driving unit is similar to that described above with reference to FIGS. 4 to 6, so its description will be omitted. For reference, the first body 410 may correspond to the terminal main body 100' of the former exemplary embodiment, and the second body 420 may correspond to the wireless keypad 200 of the former exemplary embodiment.

According to the present exemplary embodiment, there is no need to connect the touch input unit 430 and the first body 410 by a wireline, so a cable, a flexible circuit board, and the like, do not need to be used to connect the first body and the touch input unit.

In general, in the slide type terminal, the cable or the flexible circuit board are disposed at an area where the first and second bodies 410 and 420 overlap in the open configuration. According to the present exemplary embodiment, because a cable or a flexible circuit board is not required, the length (S) of the area where the first and second bodies 410 and 420 overlap can be minimized. In this case, an exposed area of the second body 420 in the open configuration can be maximized, so the area of the touch input unit 430 can be advantageously increased. In addition, because there is no need to mount a component for supplying power to the touch input unit 430 of the second body 420, the thickness (T) and size of the second body 420 can be reduced and restriction in designing can be reduced.

Figure 8:
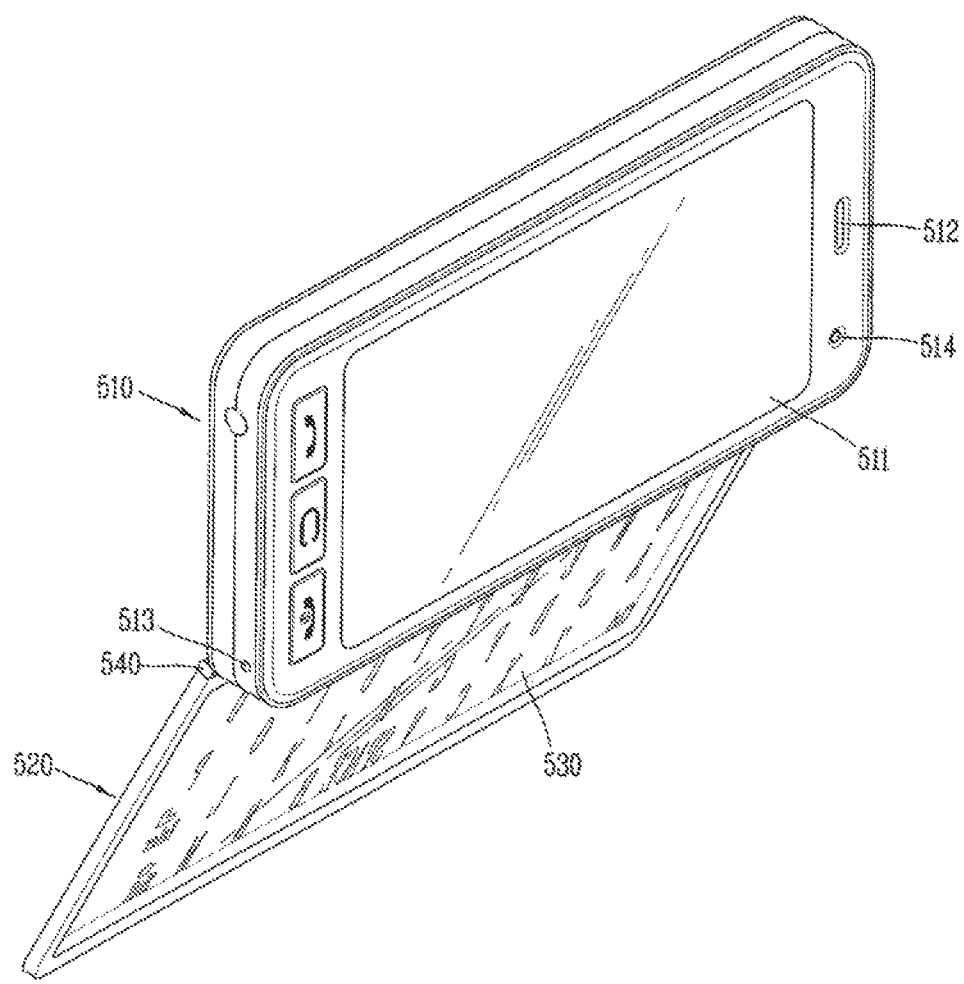
FIG. 8 is a perspective view of a mobile terminal according to a third exemplary embodiment of the present invention.

FIG. 8 is a perspective view of a mobile terminal according to a third exemplary embodiment of the present invention.

A mobile terminal according to the third exemplary embodiment of the present invention includes a first body 510 having a wireless communication module and a second body 520 connected to the first body 510 such that it can be relatively movable. The mobile terminal according to the present exemplary embodiment is configured such that the second body 520 is rotatably connected to the first body 510, and, excluding this structure, the mobile terminal according to the third exemplary embodiment of the present invention has the same configuration as that of the second exemplary embodiment of the present invention.

The first body 510 may include a display unit 511, a speaker 512, a microphone 513, a camera 514, a user input unit, and the like. The second body 520 may include a touch input unit operating in a tactile manner. The mobile terminal includes a driving unit for operating the touch input unit 530 by using power of the first body.

The second body 520 is configured to cover a front surface or a rear surface of the first body according to its relative rotation. According to the present exemplary embodiment, a closed configuration, in which the second body 520 covers the rear surface of the first body 510 according to a relative rotation of the second body 520, and an open configuration, in which the display unit 511 and the touch input unit 530 are directed in the same direction, can be implemented.

The first and second bodies 510 and 520 are connected by a hinge connection part 540. Also, in the present exemplary embodiment, a flexible circuit board for connecting the first body 510 and the touch input unit 530 is not required, so the size of the hinge connection part 540 can be minimized and the thickness and size of the second body 520 can be reduced.

Figure 9A:
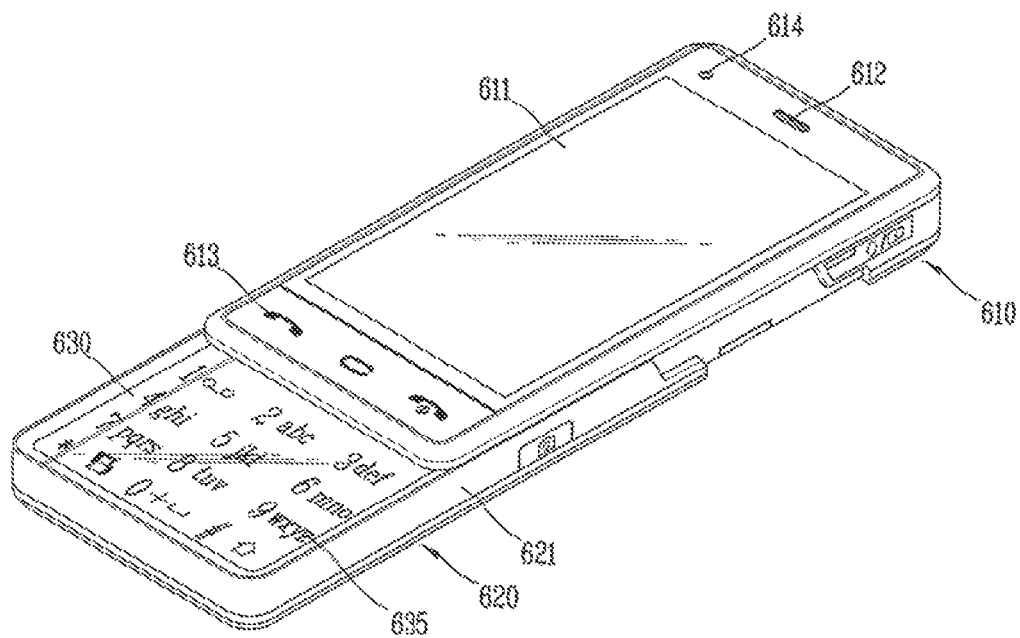
FIGS. 9A and 9B are front and rear perspective views showing a mobile terminal according to a fourth exemplary embodiment of the present invention.
Figure 9B:
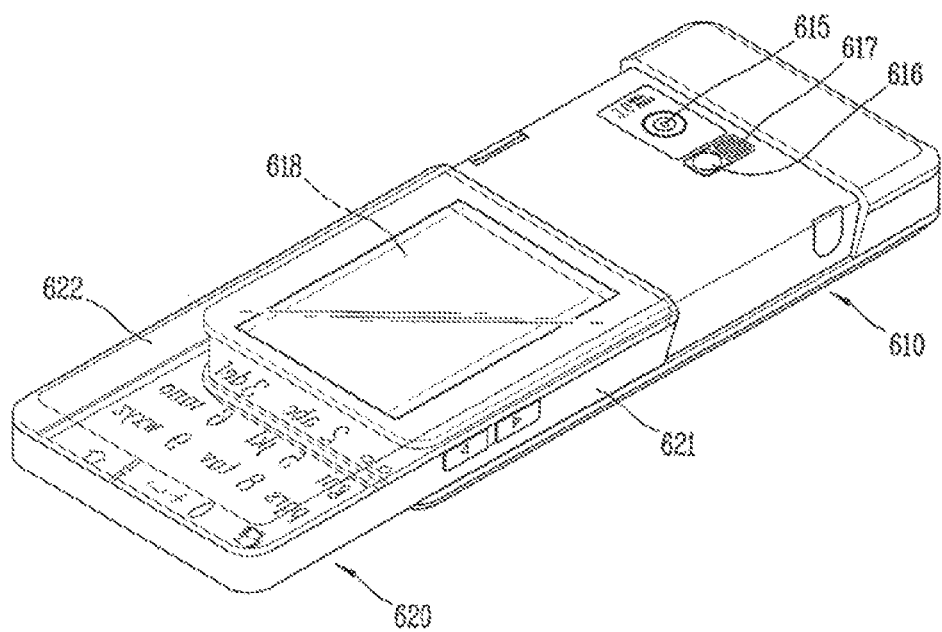

FIGS. 9A and 9B are front and rear perspective views showing a mobile terminal according to a fourth exemplary embodiment of the present invention.

A mobile terminal according to the fourth exemplary embodiment of the present invention includes a first body 610 and a second body 620 which are connected to be slidably movable. The first body 610 includes a wireless communication module therein.

The first and second bodies 610 and 620 may be formed in a bar shape so as to overlap with each other. The first and second bodies 610 and 620 are formed to have a channel-like sectional shape and disposed to face each other, thus implementing a form factor that can minimize a generation of a step between a front surface of the first body 610 and that of the second body 620 or a step between a rear surface of the first body 610 and that of the second body 620.

According to the present exemplary embodiment, the first body 610 may include a display unit 611, an audio output module 612, a camera 614, a user input unit 613, and the like, mounted thereon, and the rear surface of the first body 610 may include a camera 615, a mirror 616, a flash 617, a power supply unit 618, and the like, mounted thereon.

The second body 620 includes a slide part 621 slidably coupled to the side of the first body 610 and a cover part 622 coupled to the slide part 621 and formed to be slidably movable along the rear surface of the first body 610.

A touch pad 630 (e.g., a touch input unit) is coupled to the slide part 621. The touch pad 630 is configured to be accommodated in the interior of the first body 610 or drawn out of the first body 610. Characters, numbers, symbols, and the like, may be formed on the touch pad 630. The characters, numbers, symbols, and the like, 635 may be formed to be carved on the surface of the touch pad 630, or the like, and can be configured to be identified by an illumination unit as described above with reference to FIG. 6.

According to the present exemplary embodiment, the touch pad 630 and the cover part 622 may be made of a light-transmissive material. Thus, an object at the opposite side may be seen through the touch pad 630 and the cover part 622 made of a light-transmissive material. Here, 'light-transmissivity' includes 'complete light-transmissivity' (transparency) or 'semi-light-transmissivity' (translucency).

The shape and disposition of the first body 610 and the second body 620 can minimize an increase in the difference between the thickness of the first body 610 and the overall thickness of the mobile terminal and reduce a generation of a step between the first body 610 and the second body 620.

The mobile terminal according to the present exemplary embodiment also includes a driving unit for operating the touch pad 630 by using power of the first body 610. Thus, a cable or a flexible circuit board for connecting the first body 610 and the touch pad 630 are not required, and thus the driving unit according to the present exemplary embodiment can be suitable for implementing a form factor as described above.

Figure 10A:
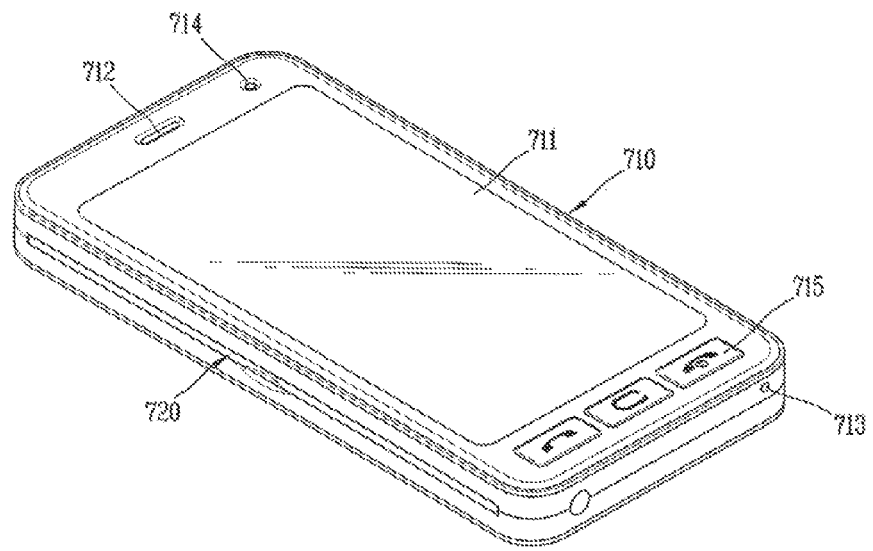
FIGS. 10A to 10C are perspective views showing a mobile terminal according to a fifth exemplary embodiment of the present invention.
Figure 10B:
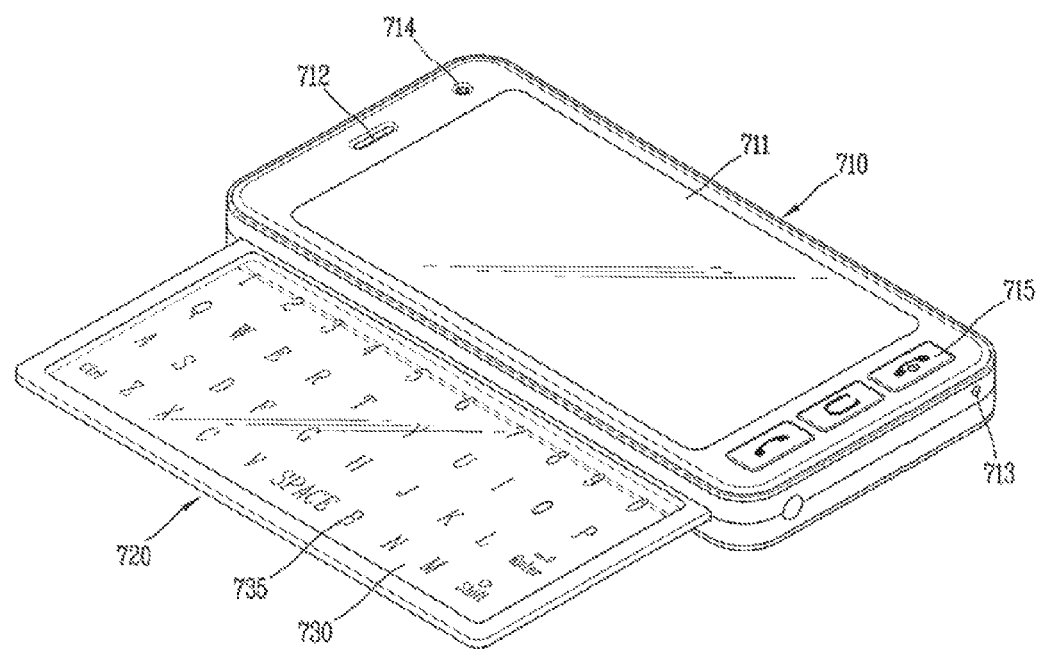
Figure 10C:
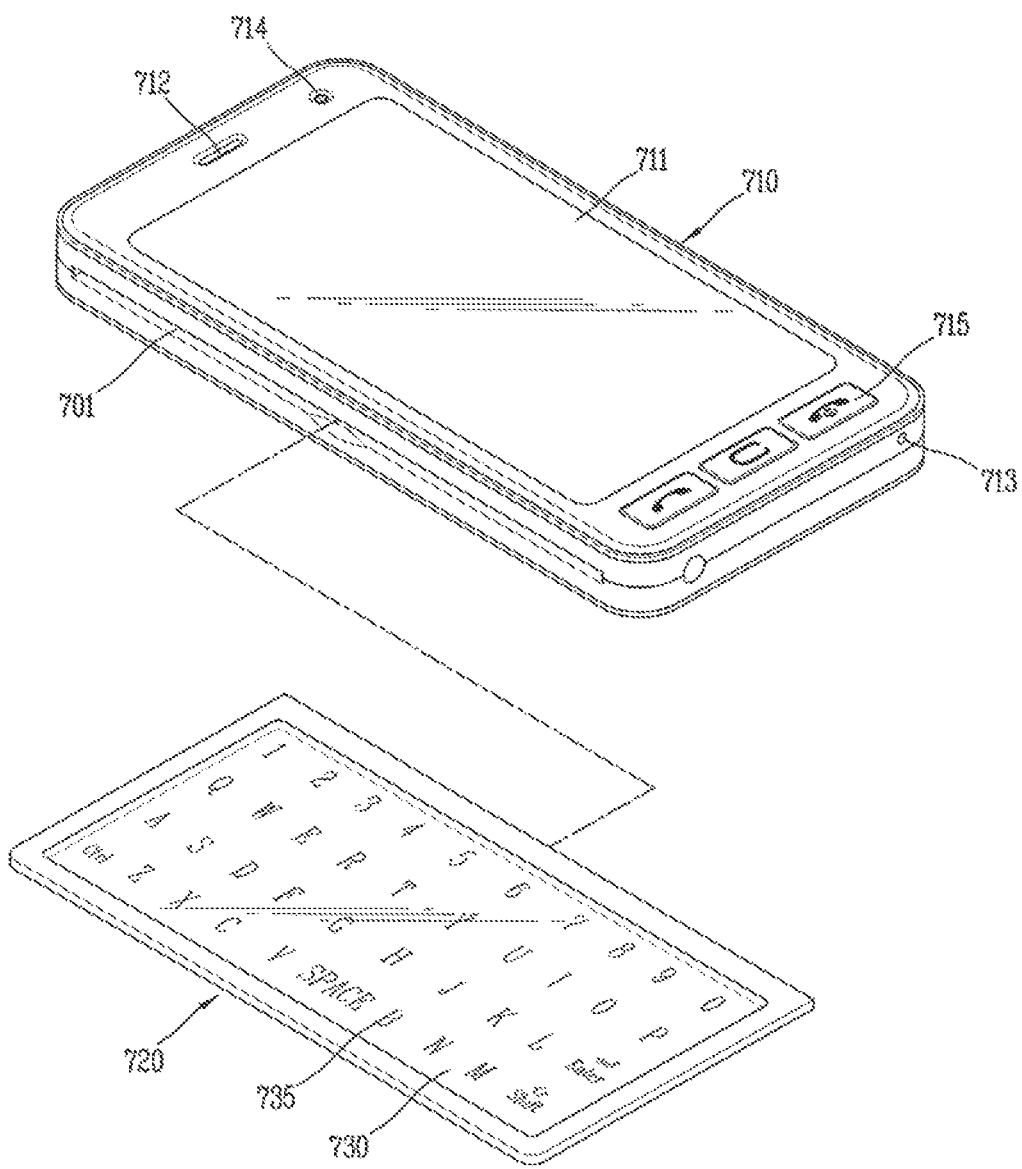

FIGS. 10A to 10C are perspective views showing a mobile terminal according to a fifth exemplary embodiment of the present invention.

A mobile terminal according to the fifth exemplary embodiment of the present invention includes a terminal main body 710 (or a first body) and a wireless keypad 720 (or a second body) which can be drawn out of the terminal main body 710. Elements mounted on the terminal main body 710 and the wireless keypad 720 are similar to those of the elements in the first exemplary embodiment.

The terminal main body 710 includes a display unit 711, a speaker 712, a microphone 713, a camera 714, a user input unit 715, and the like. A touch pad 730 is mounted on the wireless keypad 720, and the touch pad 730 is operated by using power of the terminal main body 710 according to an operation of a driving unit.

The wireless keypad 720 is implemented to be powerless, so it can be configured to be very thin. Thus, the wireless keypad 720 can be drawn out without making the thickness of the terminal main body 710 relatively thick.

A withdrawal hole 701 (See FIG. 10C) of the wireless keypad 720 may be formed on the side of the terminal main body 710, and the wireless keypad 720 may be mounted in the interior of the withdrawal hole 701 and drawn out of the terminal main body 710 in a sliding manner.

The wireless keypad 720 may be configured to be moved to a first configuration in which the wireless keypad 720 is accommodated in the interior of the withdrawal hole 701 as shown in FIG. 10A, a second configuration in which the wireless keypad 720 is drawn out by a certain distance from the withdrawal hole 701 to expose the touch pad 730 as shown in FIG. 10C, and a third configuration in which the wireless keypad 720 is separated from the terminal main body 710.

A locking unit may be additionally provided between the terminal main body 710 and the wireless keypad 720 in order to lock the wireless keypad 720 to the terminal main body 710 or unlock the wireless keypad 720 from the terminal main body 710.

According to this form factor, the form factor of the bar type terminal as in the first configuration can be implemented, and the form factor of the slide type terminal as in the second configuration can be implemented. Besides, the bar type terminal and the separate wireless keypad as in the third configuration can be implemented.

Figure 11:
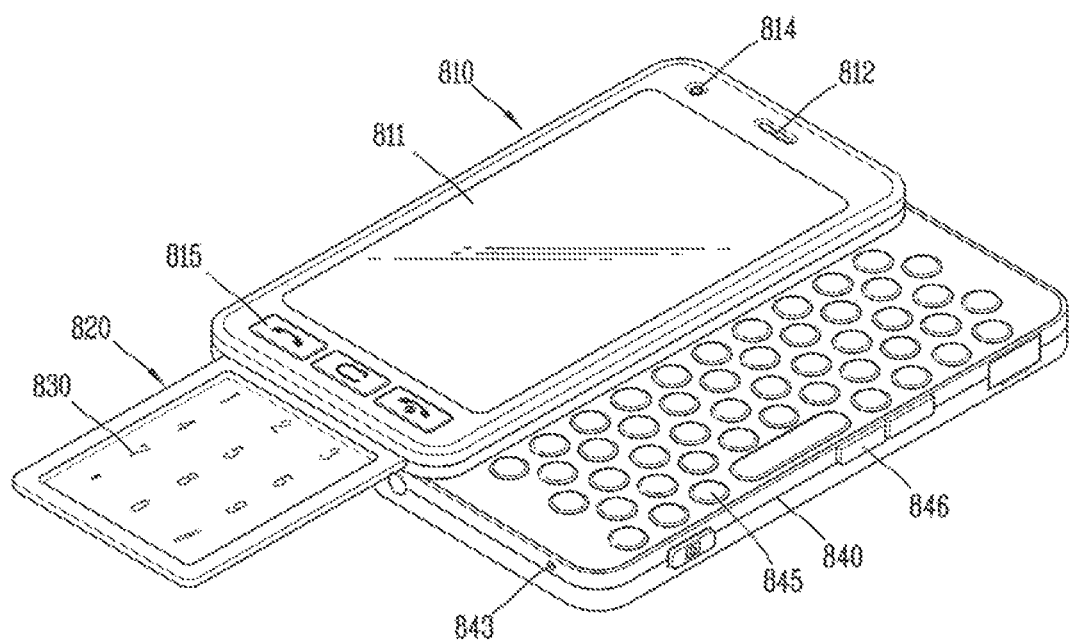
FIG. 11 is a perspective view showing a mobile terminal according to a sixth exemplary embodiment of the present invention.

FIG. 11 is a perspective view showing a mobile terminal according to a sixth exemplary embodiment of the present invention.

A mobile terminal according to the sixth exemplary embodiment of the present invention includes a first body 810 having a wireless communication module, a second body 820 mounted on the first body 810 such that it can be drawn out, and a third body 840 slidably mounted on one surface of the first body 810.

A display unit 811, a speaker 812, a camera 814, a user input 815, and the like, are mounted on the first body 810, and a touch pad 830 for a touch input is provided to the second body 820. A user input unit 845 of a keypad type, a side key 846, a microphone 843, and the like, may be provided to the third body 840. The touch pad 830 is operated by using power of the first body 810.

The second body 820 is configured to be drawn out of the first body 810 along a first direction, and the third body 840 is configured to slidably move on a rear surface of the first body 810 along a second direction. Here, the first direction may be one of a widthwise direction and a lengthwise direction of the first body 810, and the second direction may be another of the widthwise direction and the lengthwise direction of the first body 810. In the present exemplary embodiment, it is illustrated that the first direction is the lengthwise direction of the first body 810, and the second direction is the widthwise direction of the first body 810.

The second body 830, having a form of a wireless keypad, may be configured to move between the first to third configurations likewise as in the fifth exemplary embodiment of the present invention as described above.

Figure 12B:
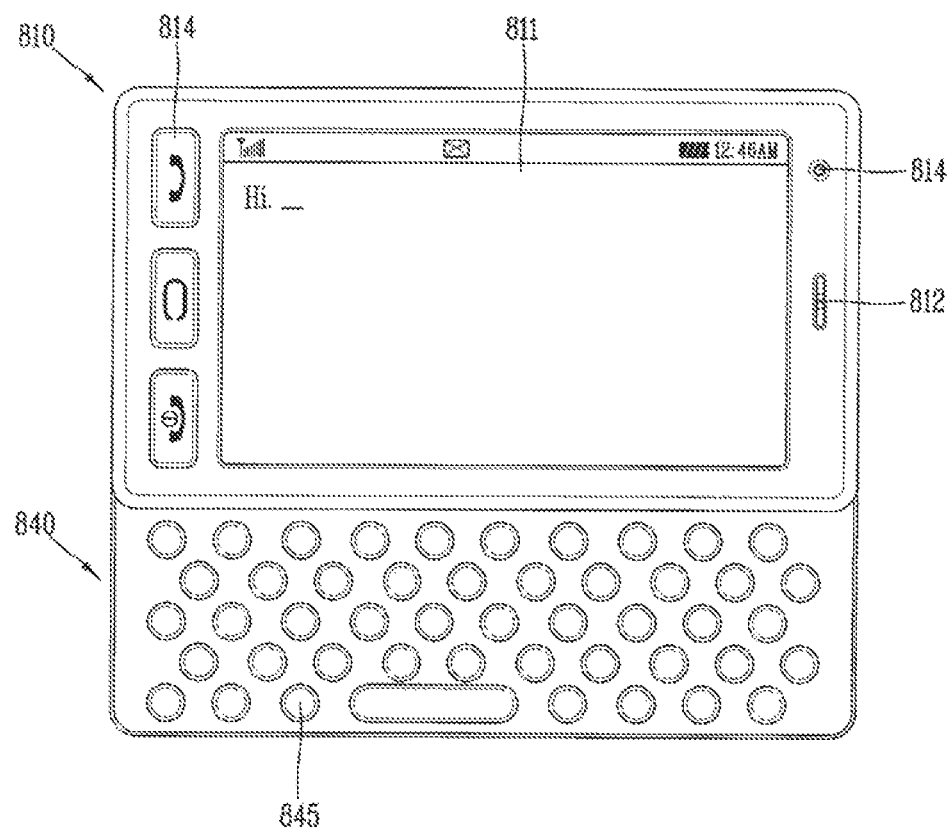

FIGS. 12A and 12B are plan views showing an operational state of the mobile terminal illustrated in FIG. 11.

As shown in FIGS. 12A and 12B, the mobile terminal in the closed configuration may be changed into the open configuration as the second and third bodies 820 and 840 are selectively moved. The first open configuration may be implemented when the second body 820 is moved in the first direction in FIG. 12A, and the second open configuration may be implemented when the third body 840 is moved in the second direction as shown in FIG. 12B.

The user may input a phone number, or the like, in a phone mode by using the touch pad 830 of the second body 820 in the first open configuration, and input characters, or the like, in a text mode by using the user input unit 845 of the third body 840 in the second open configuration. The display unit 811 may be set such that an output direction of the display unit 811 is changed to a horizontal direction or a vertical direction in the first open configuration or in the second open configuration.

According to the present exemplary embodiment, because the second body 820 does not have a battery, the thickness of the second body 820 can be reduced, and accordingly, the overall thickness of the mobile terminal can be reduced in the foregoing form factor.

Figure 13:
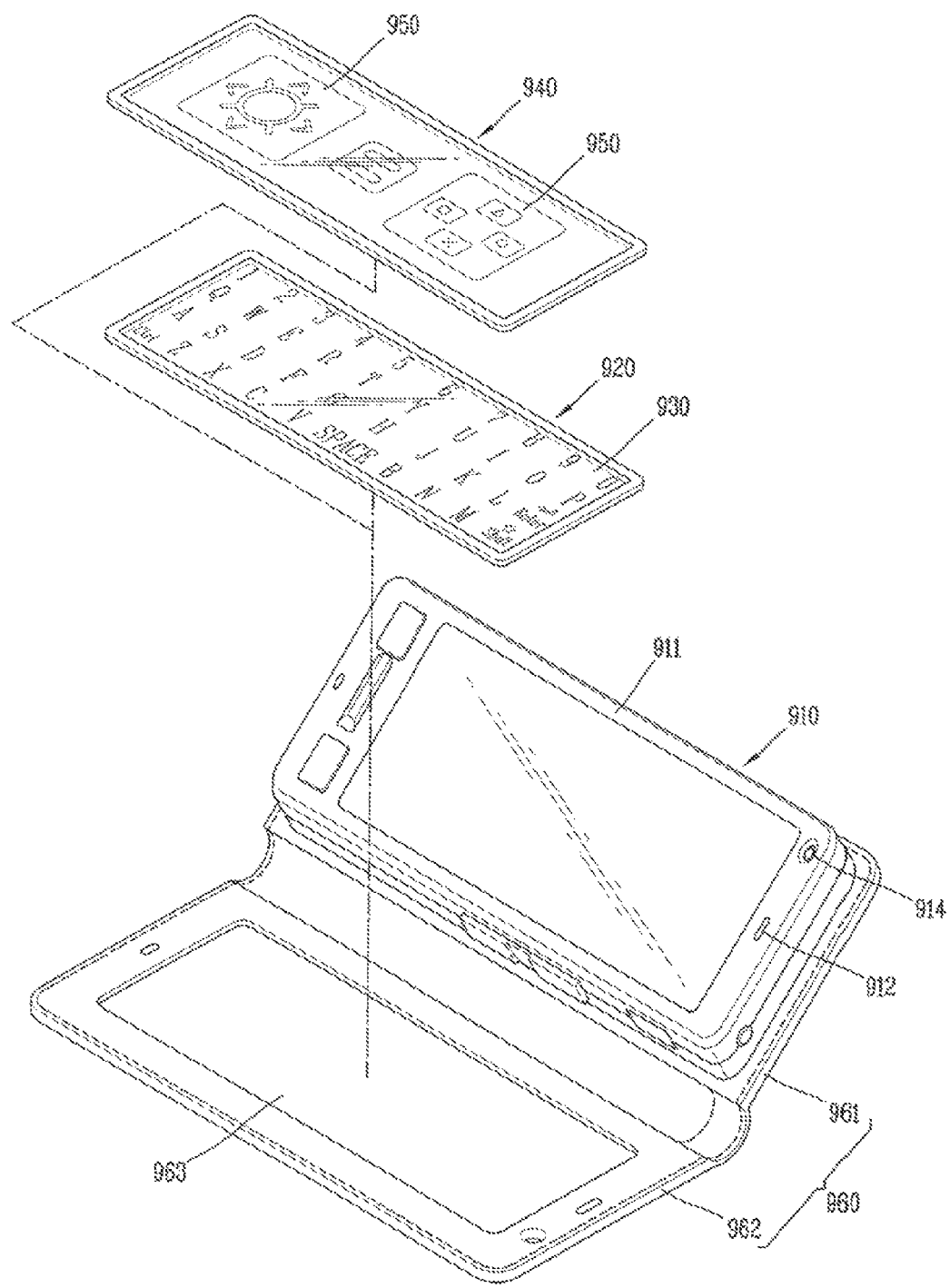
FIG. 13 is a perspective view showing a mobile terminal according to a seventh exemplary embodiment of the present invention.

FIG. 13 is a perspective view showing a mobile terminal according to a seventh exemplary embodiment of the present invention.

A mobile terminal according to the seventh exemplary embodiment of the present invention additionally includes a pouch 960. to which a terminal main body 910 is detachably attached. A rear surface of the terminal main body 910 is coupled to the pouch 960, and the pouch 960 is configured to expose or cover a front surface 911 of the terminal main body 910.

The pouch 960 may include a first cover part 961 for mounting the terminal main body 910 thereon, and a second cover part 962 extending from the first cover part 961 to cover the front surface 911 of the terminal main body 910.

Wireless keypads 920 and 940 may be detachably mounted on the second cover part 962 of the pouch 960. The configuration in which the wireless keypad 920 is mounted on a keypad mounting part 963 can be implemented by the attaching and detaching unit as described above, so a detailed description thereof will be omitted.

The wireless keypads 920 and 940 are operated by using power of the terminal main body 910 by a driving unit. The plurality of wireless keypads 920 and 940 may be formed so as to be replaced to be mounted on the pouch 960.

According to the present exemplary embodiment, the wireless keypads 920 and 940 includes a first keypad 920 for inputting characters and a second keypad 940 for playing games. Touch pads 930 and 950 for inputting characters or manipulating games are mounted on the first and second keypads 920 and 940. The wireless keypads 920 and 940 may be implemented in various forms according to operation modes in use.

The first and second keypads 920 and 940 may be replaced to be mounted on the second part 962 of the pouch 960 according to an operation mode. Because the wireless keypads 920 and 940 are not required to be connected by a wireline, there is no need to form a connection terminal at the second part 962 of the pouch 960.

As so far described, according to the exemplary embodiments of the present invention, because the driving unit is provided to operate the wireless keypad by using power of the terminal main body, a powerless wireless keypad that does not require power can be implemented.

Also, because the wireless keypad does not require power and the driving unit can be implemented through a simple circuit configuration, the size and thickness of the wireless keypad can be minimized, and thus, various designs can be implemented without any restrictions.

The structure of the touch input unit can be applied to the second body connected to the first body such that it can be relatively movable, in order to implement various form factors of the mobile terminal.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:
1. A mobile terminal comprising:
   a main body comprising a wireless communication module;
   a wireless keypad configured to operate in a tactile manner in order to input information via the main body; and
   a driving unit configured to control the wireless keypad using power of the main body,
   wherein the driving unit comprises:
      a first electrode located in the main body and a second electrode located in the wireless keypad;
      an electric field formation unit located in the main body and configured to apply voltage to the first electrode to generate an electric field between the first and second electrodes; and
      a controller located in the main body and configured to detect information related to a touch applied to the wireless keypad based on a change in the electric field between the first and second electrodes generated by the touch,
   wherein the wireless keypad comprises a touch pad having a plurality of conductive patterns connected to the second electrode for detecting the touch, and
   wherein each of the plurality of conductive patterns is connected to one of a plurality of resistors each having a different length such that each of the plurality of conductive patterns has a different impedance value.

2. The mobile terminal of claim 1, wherein the electric field formation unit comprises a battery for supplying power to the main body.

3. The mobile terminal of claim 1, wherein the first electrode is mounted at a corner portion of the main body and the second electrode is mounted at a corner portion of the wireless keypad.

4. The mobile terminal of claim 1, further comprising:
a plurality of channel units located between the plurality of conductive patterns and the second electrode to group the conductive patterns by channels, wherein each of the plurality of channel units has a different impedance value.

5. The mobile terminal of claim 1, further comprising an outer member made of an opaque material mounted at an outline of the touch pad, wherein the touch pad is made of a light-transmissive material.

6. The mobile terminal of claim 5, wherein the second electrode is located at an inner side of the outer member.

7. The mobile terminal of claim 1, further comprising a power supply unit located between the main body and the wireless keypad, wherein the wireless keypad further comprises an illumination unit configured to illuminate the touch pad using power from the power supply unit.

8. The mobile terminal of claim 7, wherein the power supply unit comprises:
a magnetic field generation coil connected to one side of the first electrode and configured to generate a magnetic field using voltage from the electric field formation unit; and
a magnetism induction coil connected to both the second electrode and the illumination unit and configured to generate an induced electromotive force using an electric field of the magnetic field generation coil.

9. The mobile terminal of claim 1, further comprising:
a keypad mounting part formed on one surface of the main body; and
an attaching and detaching unit,
wherein the wireless keypad is detachably mounted to the keypad mounting part by the attaching and detaching unit.

10. The mobile terminal of claim 9, wherein the attaching and detaching unit comprises:
an outer member made of a metal material that is formed at an outline of the wireless keypad; and
a magnet mounted on the keypad mounting part and formed to cover the outer member when the wireless keypad is mounted.

11. The mobile terminal of claim 1, further comprising a withdrawal hole formed on the main body, wherein the wireless keypad is mounted in an interior of the withdrawal hole such that the wireless keypad can be moved into and withdrawn from the withdrawal hole.

12. The mobile terminal of claim 11, wherein the wireless keypad is movable such that it has a first configuration in which the wireless keypad is slid within the withdrawal hole, a second configuration in which the wireless keypad is withdrawn from the withdrawal hole by a certain distance, and a third configuration in which the wireless keypad is separated from the main body.

13. The mobile terminal of claim 1, further comprising:
a pouch covering at least a portion of the main body and to which the main body is detachably coupled and the wireless keypad is detachably mounted.

14. The mobile terminal of claim 13, further comprising a plurality of wireless keypads configured to be replaceably and detachably mounted in the pouch.

15. A mobile terminal comprising:
a first body comprising a wireless communication module;
a second body connected to the first body and configured to be movable relative to the first body;
a touch input unit located on the second body and configured to operate in a tactile manner; and
a driving unit configured to control the touch input unit by using power of the first body,
wherein the driving unit comprises:
a first electrode located in the first body and a second electrode located in second body;
an electric field formation unit located in the first body and configured to apply voltage to the first electrode to form an electric field between the first and second electrodes; and
a controller mounted in the first body and configured to detect information related to a touch applied to the touch input unit based on a change in the electric field between the first and second electrodes generated by the touch,
wherein the touch input unit comprises a touch pad having a plurality of conductive patterns connected to the second electrode for detecting the touch, and
wherein each of the plurality of conductive patterns is connected to one of a plurality of resistors each having a different length such that each of the plurality of conductive patterns has a different impedance value.

16. The mobile terminal of claim 1, wherein the electric field formation unit comprises a battery for supplying power to the first body.

17. The mobile terminal of claim 15, wherein the second body is further configured to be slidably movable relative to the first body.

18. The mobile terminal of claim 17, wherein the second body is further configured to be slidably movable on one surface of the first body.

19. The mobile terminal of claim 17, wherein the second body is further configured to be slidably moved into and withdrawn from an interior of the first body.

20. The mobile terminal of claim 15, wherein the second body is rotatably connected to the first body.

21. The mobile terminal of claim 15, further comprising a display unit mounted on a front surface of the first body and configured to display visual information and wherein the second body is further configured to cover either the front surface or a rear surface of the first body.

22. The mobile terminal of claim 15, further comprising a third body provided on one surface of the first body and configured to be slidable along a first direction and wherein the second body is further configured to be entered into and withdrawn from the first body along a second direction.

23. The mobile terminal of claim 22, wherein:
the first direction is one of a widthwise direction and a lengthwise direction of the first body; and
the second direction is the other of the widthwise direction and the lengthwise direction of the first body.

24. The mobile terminal of claim 15, wherein the second body comprises:
a slide part configured to be slidably movable along a side surface of the first body; and
a cover coupled to the slide part and configured to be slidably movable along a rear surface of the first body,
wherein the touch input unit is coupled to the slide part such that it can inserted into and withdrawn from an interior of the first body.

* * * * *